United States Patent [19]

Glenn

[11] Patent Number: 5,245,416

[45] Date of Patent: Sep. 14, 1993

[54] MULTICOLOR SOLID STATE IMAGER WITH ROTATIONAL SWING DRIVE

[75] Inventor: William E. Glenn, Ft. Lauderdale, Fla.

[73] Assignee: Florida Atlantic University, Boca Raton, Fla.

[21] Appl. No.: 828,306

[22] Filed: Jan. 30, 1992

[51] Int. Cl.$^5$ .............................................. H04N 9/07
[52] U.S. Cl. ........................................ 358/44; 358/55
[58] Field of Search ...................... 358/41, 42, 44, 48, 358/213.28

[56] References Cited

U.S. PATENT DOCUMENTS

| | | | |
|---|---|---|---|
| 4,404,585 | 9/1983 | Hjortzberg | 358/41 |
| 4,652,909 | 3/1987 | Glenn . | |
| 4,713,683 | 12/1987 | Fujimori | 358/42 |
| 4,758,883 | 7/1988 | Kawahara | 358/44 |
| 4,791,479 | 12/1988 | Ogiu | 358/44 |
| 4,860,092 | 8/1989 | Hieda | 358/41 |
| 4,878,113 | 10/1989 | Nakamura | 358/42 |
| 4,920,418 | 4/1990 | Robinson | 358/213.28 |
| 4,998,164 | 5/1991 | Endo | 358/44 |
| 5,063,450 | 11/1991 | Pritchard | 358/213.28 |

FOREIGN PATENT DOCUMENTS 287394 12/1986 Japan .
140586 6/1987 Japan .

OTHER PUBLICATIONS

W. E. Glenn, et al. "Compatible Transmission of High Definition Television Using Bandwidth Reduction," Proc. 37th Annual Broadcast Engineering Conference, 1983, pp. 341-349.
W. E. Glenn, et al. "Reduced Bandwidth Requirements for Compatible High Definition Television Transmission<" Proc. 38th Annual Broadcast Engineering Conference, 1984, pp. 297-305.
E. M. Granger, et al. "Visual Chromaticity Modulations Transfer Function," Journal of the Optical Society of America, vol. 63, No. 9, 1973, pp. 1173-1174.
W. E. Glenn, et al. "Logarithmic A/D Converters Used in Video Signed Processing Systems," SMPTE Journal Preprint No. 132-121, Oct. 13-17, 1990, pp. 1-7.
W. E. Glenn, et al. "Signed Processing for Compatible HDTV," SMPTE Journal, Nov. 1989, pp. 812-816.

Primary Examiner—John K. Peng
Assistant Examiner—Chris Grant
Attorney, Agent, or Firm—Brumbaugh, Graves, Donohue & Raymond

[57] ABSTRACT

A color camera having good to-noise ratio and good resolution uses a single CCD image sensor chip with an optical color filter having a multiplicity of clusters of three circular areas, each of a different characteristic color, hexagonally arranged so as to form a multiplicity of horizontal rows each horizontally offset from the rows immediately above and below it by one-half the diameter of the circular areas. The circular areas have substantially the same diameter as the pixels of the CCD sensor. The camera includes mechanical apparatus for providing motion of the image with respect to the chip in a circle that is about one pixel in diameter, causing the image to rotate sequentially through the three different colored pixel fields of a cluster. Signals clocked out of the CCD sensor are processed to obtain R, G and B signals and low and high resolution luminance signals which are added to derive a final luminance signal.

16 Claims, 2 Drawing Sheets

MULTICOLOR SOLID STATE IMAGER WITH ROTATIONAL SWING DRIVE

BACKGROUND OF THE INVENTION

This invention relates generally to video signal processing and, more particularly, to a CCD camera and a signal processing system for use therewith.

As is known, a CCD (charge coupled device) sensor of the kind currently used in television cameras is a large scale integrated circuit device consisting of several thousand individual wells or pixels which detects an incident light image and develops a television picture signal. Heretofore, the design of such CCD cameras have required a number of compromises. Because of yield problems during manufacture of such sensors, it has been necessary to keep the number of pixels in the LSI chip at a minimum which, in turn, is reflected in the design of the camera system. To take into account the limited number of pixels, two types of cameras have evolved: a first type utilizing three LSI chips in combination with a dichroic prism splitter (for professional cameras), and a second type, primarily for consumer camcorders, utilizing a single LSI chip in combination with a color stripe filter disposed in the optical path of the scene. The latter type sacrifices both resolution and sensitivity in order to get color. If the colored stripes of the filtr are yellow, cyan and magenta the loss of luminance sensitivity is minimized (⅔ of normal) but the signal-to noise ratio of the color signal is worse.

It is known from vision research conducted by applicant and others, reported in the following publications, that human vision cannot perceive changes in high spatial resolution information at as fast a rate as it can perceive changes in low spatial resolution information: "Compatible Transmission of High Definition Television Using Bandwidth Reduction", W. E. Glenn et al., Proceedings of the 37th Annual Conference of National Association of Broadcasters, 1983; "Reduced Bandwidth Requirements for Compatible High Definition Television Transmission", W. E. Glenn et al., Proceedings of the 38th Annual Broadcast Engineering Conference of National Association of Broadcasters, 1984; "Visual Chromaticity-Modulation Transfer Function", Granger, et al., Journal of the Optical Society of America, Vol. 63, No. 9, Sep., 1973. The temporal response of the visual system for the highest spatial frequencies in luminance and for color is about half the speed of that for low spatial frequency luminance. Also, the human visual system has better resolution horizontally and vertically than it does diagonally, which suggests that the number of pixels in a camera can be minimized by using offset sampling; that is, the pixels on adjacent lines should be shifted horizontally by ½ pixel. Some chip designers are now using this technique in the CCD imager chips. Another characteristic of the human visual system, which has heretofore been used in most color systems, is that the spatial resolution for color is less than half that of luminance.

It is among the objects of the present invention to utilize these three factors of the human visual system to achieve improved performance of a single chip CCD camera.

A more specific object of the invention is to provide a high performance, real-time, high-resolution CCD color camera.

SUMMARY OF THE INVENTION

The present invention is directed to a color camera system utilizing a single CCD sensor chip for generating color television signals representative of the color content of a scene. In accordance with the invention, the CCD sensor has affixed thereto a color filter comprising an array of a multiplicity of clusters of three circular areas each having a different characteristic color, preferably the complements of the primary colors; viz, yellow (Y), cyan (C) and magenta (M). The clusters are hexagonally arranged so to form a multiplicity of adjacent horizontal rows of circular areas, which rows are parallel to the direction of horizontal line scanning of the CCD sensor, and each row is horizontally offset from its adjacent rows by one-half the diameter of the circular areas. As a consequence of this arrangement, each horizontal row and each of a multiplicity of diagonally-oriented rows of circular areas present a repeating sequence of magenta (M), cyan (C) and yellow (Y), and in any cluster, regardless of its location in the array, one circle is M, one is C and the third is Y, which assures that resolution of any color is the same in any direction. The CCD chip and associated filter is rotated with respect to the image in a circle that is about one pixel in diameter, causing the image to rotate through the three colored pixel fields sequentially. Since only one of the three primary colors is absorbed for each pixel, the sensitivity for any color is two-thirds that of a CCD chip without a filter.

In clocking out the signals for each field, two adjacent frame lines are clocked out during the scan. The sum of the signals from a cluster of three pixels, one for each of the three colors yellow, cyan and magenta, is used to provide a low resolution luminance signal for each field; because of the spatial integration of the three pixels, the signal-to-noise ratio of this signal is improved. The pixels clocked out on three successive fields are shifted in a circular fashion to compensate for the circular shift of the image on these fields.

The color information is obtained by summing three fields of information, appropriately positioned to compensate for the image motion, the color being obtained from the three different colored pixels in a cluster. The integration of three signals in time improves the signal-to-noise ratio of the color information signal. Because of temporal integration and the color pixel pattern, the color resolution is the same as that for the low resolution luminance.

The detail luminance information is obtained by integrating three successive fields in time with the pixels shifted in a circular fashion to compensate for image motion; the integration in time of each pixel for three fields improves it signal-to-noise ratio, and since it is the integral of all three different colored pixels it is not color dependent. To derive detail luminance, the high spatial frequencies are derived using an array processor for a central pixel with portions of the signals surrounding the pixel either subtracted or added. The final luminance signal is derived by adding the low resolution luminance and detail luminance signals. This can be done in either progressive or interlaced format; in either case, the resolution will be the same as is obtained by progressive scan cameras.

Other features and advantages of the invention will become apparent, and its construction and operation better understood, from the following detailed description when read in conjunction with the accompanying drawings.

DESCRIPTION OF THE PREFERRED EMBODIMENT

Figure 1:
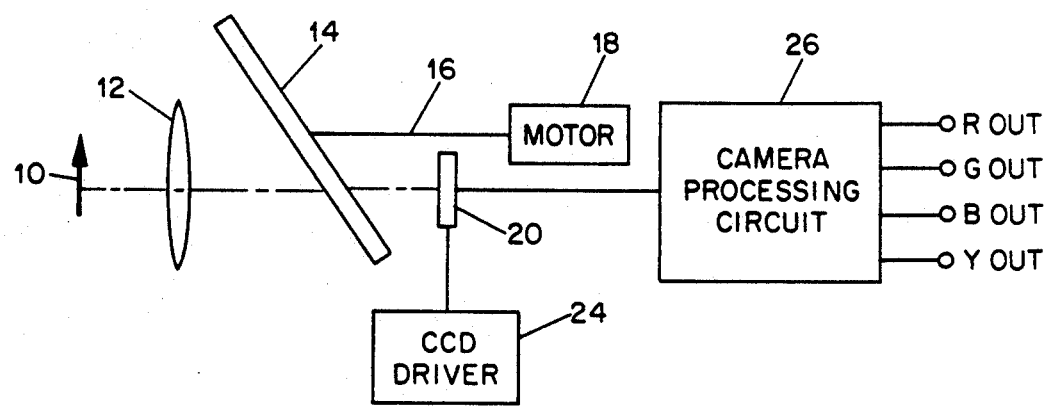
FIG. 1 is a simplified block diagram of a CCD color camera in accordance with one embodiment of the invention.
Figure 2:
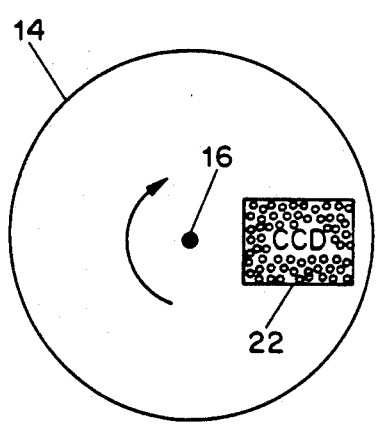
FIG. 2 is an elevation end view of the apparatus shown in FIG. 1.

FIGS. 1 and 2 diagrammatically illustrate a CCD color camera constructed in accordance with one embodiment of the invention. Light from an object field 10 is collected by an optical system represented pictorially by a lens 12. For reasons which will presently become apparent, the collected light passes through a glass plate 14 which is tipped with respect to and driven in rotation about an axis 16 by a motor 18. The angle of inclination of the plate 14 to the rotational axis and the optical parameters of the plate are chosen to displace the collected light image by one-half the diameter of each pixel of a CCD sensor 20 positioned on the opposite side of the plate from lens 12. The vibrating or rotating light image passes through a filter 22, which may be deposited on the input face of the CCD chip during processing of the chip and will presently be described in detail, and is received by CCD (charge coupled device) sensor 20, of known construction, which detects, stores and then reads out an accumulated electrical charge representing the light on each portion of the image. Under control of a CCD driver 24, which receives timing signals from a timing generator (not shown in FIG. 1), the CCD sensor 20 transfers the individual charges to a camera processing circuit 26 in the proper scanning sequence to constitute a television video signal. The camera processing circuit 26, shown in more detail in FIG. 6, derives the color and luminance detail information from the video signal.

Figure 3:
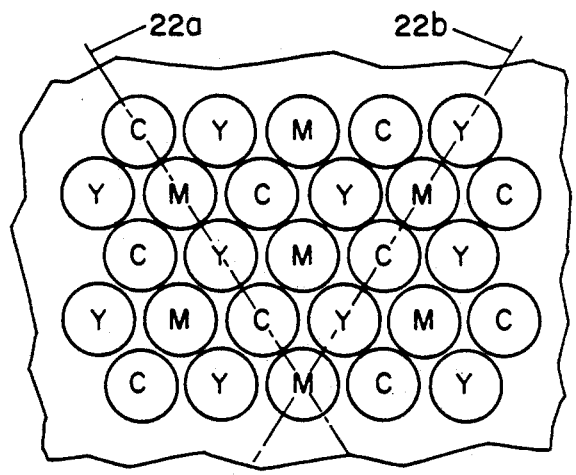
FIG. 3 shows, greatly enlarged, a fragmentary portion of a color filter utilized in the camera.
Figure 4:
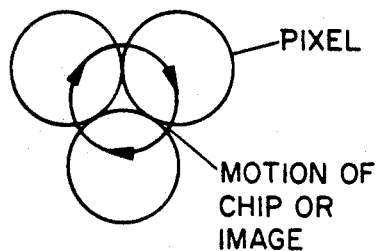
FIG. 4 is a diagram used in explaining the operation of the invention.

Filter 22, a fragmentary portion of which is shown greatly enlarged in FIG. 3, comprises a multiplicity of circular areas each having an area about the same as that of a CCD sensor pixel, hexagonally arrayed in clusters of three to form a multiplicity of contiguous horizontal rows. The circular areas in each row are horizontally offset with respect to the areas in the rows immediately above and below it by one-half the diameter of the circular areas, causing the circular areas to be arrayed along diagonal lines, two of which are represented by dash-lines 22a and 22b. Each circular area of a cluster has a different characteristic color, which preferably are complements of the primary colors red (R), green (G) and blue (B); viz, cyan (−R), designated C, magenta (−G) designated M, and yellow (−B), designated Y. The colors in each cluster are mutually arranged in a manner such that in one direction along each horizontal row and along each diagonal row the circular areas are displayed in the sequence C-Y-M-C, etc. Essential to achieving the objects of the invention is that any cluster of three contiguous circular areas, regardless of the location of the cluster in the array, includes one Y area, one C area and one M area, such that a pixel-size area of the image transmitted by refraction plate 14 rotates in a circle through the three-colored pixels field sequentially. This is illustrated in FIG. 4 wherein the inner circle with the arrows represents the motion of the image with respect to the stationary filter 22 and shows that a point in the image rotates through the M, C and Y pixels field sequentially. Since only one of the three primary colors is absorbed for each pixel, the sensitivity for any color is ⅔ of that of a CCD chip without a filter. Since, in effect, all three colors are rotated through the same point in space, one can integrate for three fields and obtain all three colors at that point; basically, the system is field sequential for each pixel except that because adjacent pixels are in different sequences there isn't the color breakup experienced in a regular field sequential camera. While there is color breakup on a pixel-by-pixel basis, there is no color breakup on average for a cluster of three, and since the human eye doesn't have good resolution in color it can't resolve color breakup within a cluster of three and it goes unobserved.

Figure 6:
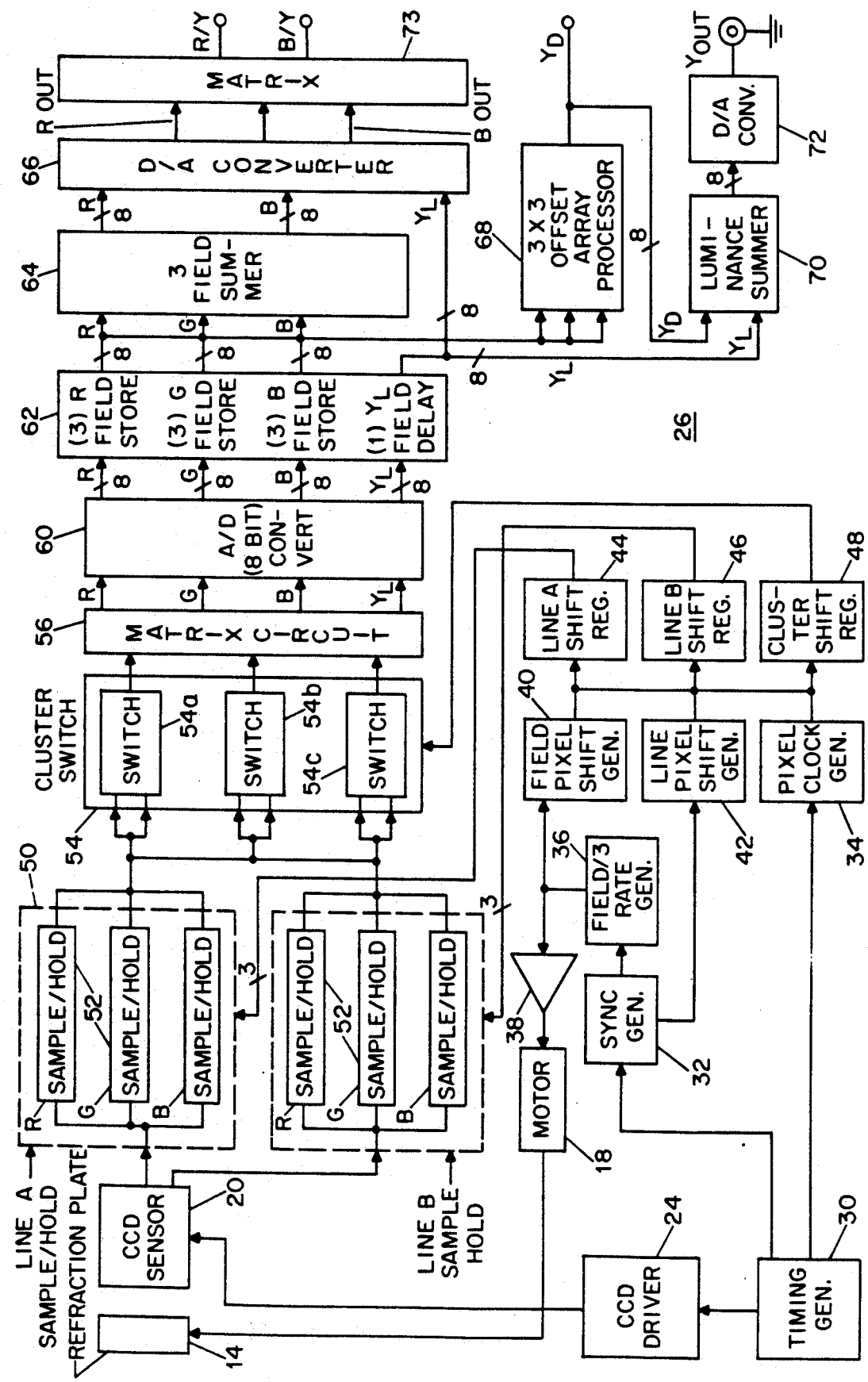
FIG. 6 is a detailed block diagram of the CCD color camera shown in FIG. 1.

Referring now to the FIG. 6, which shows in detail the components of camera processing circuit 26, the CCD sensor 20 is controlled by a CCD driver 24 of known construction which receives vertical and horizonal synchronizing signals from a timing generator 30. Timing signals from timing generator 30 are also applied to a sync generator 32 and to a pixel clock generator 34. Sync generator 32 is coupled to a generator 36 which divides by three the field rate of the CCD sensor and applies the resulting 20 Hz signal via an amplifier 38 to motor 18, which rotates refraction plate 14, and also to a field pixel shift generator 40. Another timing signal from sync generator 32 is applied to a line pixel shift generator 42, the output of which is combined with the outputs of field pixel shift generator 40 and pixel clock generator 34 to control three shift registers: a line A shift register 44, a line B shift register 46 and a cluster shift register 48. These shift registers respectively control a line A sample/hold circuit 50, a line B sample/hold circuit 52 and a cluster switch 54.

The CCD sensor 20 is a low resolution (525 lines) camera which is scanned (for NTSC) at 30 interlaced frames (60 fields) per second, and receives light from the scene via the refraction plate 14, tilted as shown in FIG. 1 and rotated at 20 revolutions per second, and the filter 22. In clocking out from CCD sensor 20 the signals for each field, two adjacent lines A and B are clocked out during the scan and applied to respective sample/hold circuits 50 and 52 each having three separate sample/hold circuits, one for each of the three colors R, G and B transmitted by the cyan, magenta and yellow areas, respectively, of filter 22, the outputs of which are combined to provide the sum of a cluster of the signals from three pixels. Th pixels clocked out on three successive fields are shifted in a circular fashion by shift registers 44 and 46 to compensate for the shift of the image on these fields.

The cluster switch 54, consisting of three separate switches 54a, 54b and 54c, under control of cluster shift register 48, transfer the cluster of signals from three pixels from each of lines A and B to a matrix circuit 56 wherein a low resolution luminance signal, $Y_L$, for each field is derived from the sum of a cluster of the signals from three pixels, one for each of the three colors, and three color signals R, G and B. These signals, which are in analog form, are converted to the digital domain by an analog to digital converter 60, preferably an 8-bit converter as indicated, preparatory to storing them in a storage device 62. Storage device 62 stores R, G and B information for three successive fields and provides a one-field delay for the low resolution luminance signal $Y_L$.

The color information is obtained by adding in a 3-field summer 64 three successive fields stored in storage device 62, the color being derived from the three colored pixels in a cluster. This integration in time of each pixel for three fields improves the signal-to-noise ratio, and because of the image motion the color resolution is the same as that for low resolution luminance. The sum of the three fields is converted to the analog domain by a digital-to-analog converter 66 to derive the two color signals R and B. These signals, plus the low resolution signal Y are then used to derive R/Y and B/Y in a matrix 73 using the procedure known from the publications "Logorithmic A/D Converters Used in Video Signal Processing Systems", William E. Glenn et al., presented at the 132nd SMPTE Technical Conference on Oct. 13-17, 1990, and "Signal Processing for Compatible HDTV", William E. Glenn, et al. SMPTE Journal, Nov. 1989.

The detail luminance information, $Y_D$, is obtained by integrating three successive fields in time with the pixels shifted to compensate for the image motion. Since each pixel is integrated in time, for three fields, the signal-to-noise ratio is improved, and being the integral of all three colored pixels it is not color dependent. The detail luminance is obtained by applying the R, G and B signals from their respective 3-field stores to a 3×3 offset array processor 68 which derives the high spatial frequencies for a central pixel with portions of the signal surrounding the pixel either subtracted or added. The final luminance signal is derived by adding in a luminance summer 70 the low resolution $Y_L$ signal, delayed by one field in storage device 62, to the detail luminance signal, $Y_D$, from array processor 68. The output of summer 70 is converted to the analog domain by a digital-to-analog converter 72. The summation can be done, with the same resolution, in either progressive or interlaced format.

The signal processing can be further refined by detecting the difference in time between the unshifted pixels for each color. For a large area color, or detail that is white in color, the sum of these difference signals will be zero; however, there will be a difference signal if there is small detail in a saturated color, in which case the low resolution luminance signal will flicker at ⅓ the field rate. This is spatial integral of the difference signal is used to cancel out this flicker.

Figure 5:
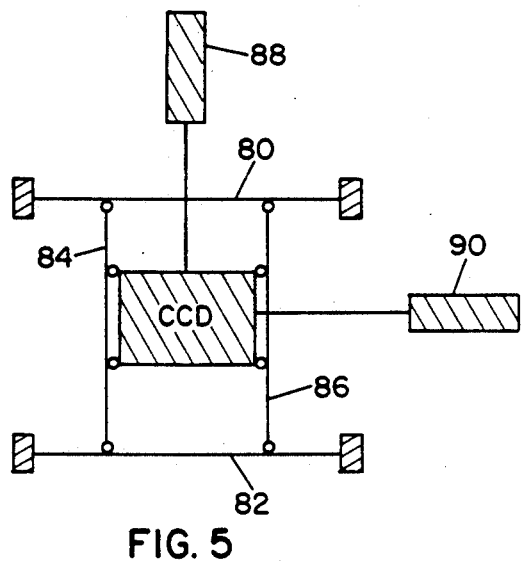
FIG. 5 is a diagrammatic representation of a CCD color camera in accordance with a second embodiment of the invention.

An alternative to the apparatus of FIG. 1 which rotates the image relative to a stationary CCD sensor, is schematically illustrated in FIG. 5 wherein a CCD sensor with affixed filter 22 is mounted in a vertical plane on a pair of horizontally disposed wire springs 80 and 82 and a pair of vertically-oriented wire springs 84 and 86 so that it can vibrate relative to the image in a circle that is about one pixel in diameter, as depicted in FIG. 4. This vibratory motion is achieved by driving the CCD sensor with cooperating vertical and horizontal linear actuators 88 and 90, respectively, which may be energized by a signal produced by the field/3 rate generator 36 shown in FIG. 6. The CCD sensor is driven, and its output signals are processed, in the same way as has been described for the FIG. 1 embodiment.

It will have become apparen that the described camera has good signal-to-noise ratio and good resolution with a single sensor chip, achieved at the cost of requiring means for providing a small mechanical circular motion of the image with respect to the chip, and several frame stores to process the image. The circular motion is achieved quite easily and inexpensively, and as the cost of frame stores come down the camera becomes more and more attractive. For less expensive cameras, the same CCD chip can be used with standard signal processing.

The invention has been described with reference to particular preferred embodiments, but variations within the spirit and scope of the invention will now occur to those skilled in the art.

I claim:

1. A color camera system for generating three color component signals representative of the color content of a scene, comprising:
   (a) a CCD image sensor chip having a multiplicity of pixel areas each of predetermined diameter arranged in an array;
   (b) a color filter affixed to said CCD sensor chip and disposed in the optical path of the scene, said filter having a multiplicity of clusters of three circular areas having said predetermined diameter each of a different characteristic color, wherein said circular areas are hexagonally arranged so as to form a multiplicity of horizontal rows each horizontally offset from adjacent rows by one-half the diameter of said circular areas;
   (c) means for moving the image of the scene with respect to said sensor chip in a circle having a diameter substantially equal to the pixel diameter for causing the image to rotate sequentially through the three different colored areas of a cluster;
   (d) means coupled to said CCD sensor chip for electronically scanning in a line pattern at a predetermined field rate the image projected through said color filter for generating output signals representative of the filtered image;
   (e) means responsive to the output of said scanning means for summing, for each of two adjacent frame lines clocked out during the scan of a field output signals from a cluster of three pixels, one for each color, for producing a low resolution luminance signal for each field; and
   (f) means including field summing means for summing three succcessive fields of information generated by said scanning means for producing said three color component signals.

2. The system in accordance with claim 1, wherein said means (c) for moving the image comprises a rotatable diffraction plate disposed in the optical path of the scene at an angle with respect to said optical path, and means for rotating said diffraction plate at a selected rate.

3. The system in accordance with claim 2, wherein said means for rotating said diffraction plate is a motor and wherein said selected rate is a predetermined fraction of the field rate of said scanning means.

4. The system in accordance with claim 1, wherein said means (c) for moving the image comprises means spring mounting said CCD sensor chip so that it can vibrate in a circle about one pixel in diameter, and actuator means engaging said CCD sensor chip for causing it to vibrate in said circle at a selected rate.

5. The system in accordance with claim 4, wherein said actuator means comprise first and second orthogonally-oriented electrically-energized linear actuators and wherein said predetermined rate is a selected fraction of the field rate of said scanning means.

6. The system in accordance with claim 1, wherein the three colors of each cluster are yellow, cyan and magenta, regardless of the location of the cluster in said color filter.

7. The system in accordance with claim 1, wherein said means (e) for summing includes three sample and hold circuits, each for sampling signals from a different one of the three pixels of a cluster, and means including switch means for outputting the sum of the signals sampled by the three sample and hold circuits.

8. The system in accordance with claim 1, wherein said means (f) further includes field store means for storing and applying said three successive fields to said means for summing.

9. The system in accordance with claim 1 further comprising means for integrating in time three successive fields for producing a detail luminance signal for each field, and means for summing said low resolution luminance signal and said detail luminance signal for obtaining luminance signals.

10. The system in accordance with claim 8, wherein said means for integrating comprises an array processor.

11. Color camera apparatus comprising:
means for focusing image light from a scene on a CCD image sensor device having a sensing surface including a plurality of pixel elements of predetermined diameter arranged in an array;
an optical color filter affixed to the sensing surface of said sensor device, said color filter having a multiplicity of clusters of three circular areas each having a diameter substantially equal to the diameter of said pixel elements, wherein each of the three circular areas of a cluster has a different characteristic color and wherein said circular areas are hexagonally arranged so as to form a multiplicity of horizontal rows each horizontally offset from adjacent rows by one-half the diameter of said circular areas;
means for moving the image of the scene with respect to said image sensor device in a circle having a diameter substantially equal to the pixel diameter for causing the light incident on said image sensor device to rotate sequentially through the three different colored areas of a cluster;
means coupled to said sensor device for electronically scanning in a line pattern at a predetermined field rate hte image light projected through said color filter, while the image of the scene is being moved with respect to said sensor device, to generate output signals corresponding to sadi filtered image light; and
means for processing said output signals including sample and hold means for summing for each of two adjacent frame lines clocked out during the scan of a field output signals from a cluster of three pixel elements, one for each color, for producing a low resolution luminance signal for each field; and
means for summing signals representing three successive fields of information generated by said scanning means for producing three color component signals.

12. The color camera apparatus as defined in claim 11, wherein said means for moving the image of the scene with respect to said image sensor device comprises an optical diffraction plate disposed in the image light path from the scene and tilted at a predetermined angle with respect to said image light path, and drive means for rotating said diffraction plate at a rate which is a predetermined fraction of said field rate.

13. The color camera apparatus as defined in claim 11, wherein said means for moving the image of the scene with respect to said image sensor device comprises drive means for imparting controlled motion of said image sensor device in a circle having a diameter substantially equal to the diameter of a pixel element at a rate which is a predetermined fraction of said field rate.

14. The color camera apparatus as defined in claim 13, wherein said drive means for imparting controlled motion to said image sensor device comprises an arrangement of springs for supporting said image sensor device for two-dimensional movement, and first and second orthogonally-oriented linear actuator means coupled to said image sensor device for moving said image sensor device against the action of said arrangement of springs and causing said image sensor device to vibrate with a circular motion.

15. The color camera apparatus as defined in claim 11, wherein said means for processing said output signals comprises three sample and hold circuits, each for sampling an output signal from a different one of the three pixel elements of a cluster, and switch means for outputting the sum of the signals sampled by the three sample and hold circuits.

16. The color camera apparatus as defined in claim 15, wherein said means for processing said output signals further comprises means for integrating in time signals representing three successive fields for producing a detail luminance signal for each field, and means for summing said low resolution luminance signal and said detail luminance signal to obtain a luminance signal.

* * * * *